Patented Nov. 22, 1938

2,137,898

UNITED STATES PATENT OFFICE 2,137,898

METHOD OF COOKING MEATS

Harry H. McKee, Chicago, Ill., assignor to Industrial Patents Corporation, Chicago, Ill., a corporation of Delaware No Drawing. Application May 6, 1933,
Serial No. 669,875

6 Claims. (Cl. 99—107)

This invention relates to a method of treating meat products and to the product of such method. One of the objects of the present invention is to provide a method for treating meat products. Another object is to provide a method for treating hams whereby a cooked, smoked ham is produced which is exceptionally tender, having unusual flavor. Another object of the invention is to provide a method whereby hams may be simultaneously cooked and smoked producing thereby a product unlike the product of separate cook and smoke.

Other objects of the invention will be apparent from the description and claims which follow.

It will be understood that the practice of the invention as applied to hams is herein described by way of illustration and not by way of limitation, the invention being applicable to all types of meat products.

I will discuss as an example, treatment of sweet pickle hams. I first soak the hams coming from pickle for from eight to twelve hours depending upon the average temperature. In case of bone-in hams after removal from soaking vats, the individual hams are hung in the smoke house or oven on standard meat trolleys. The hams may be encased in a stockinette and hung in accordance with conventional practice or in any other desired manner.

When the smokehouse is filled with hams, the air temperature is raised to 190° to 195° F. and the humidity is raised to the saturation point by the use of an open steam line in the oven. Smoke is applied simultaneously. The temperature of from 190° to 195° is maintained with the saturated air condition and a good smudge of smoke until the inside temperature of the hams has been raised to about 125°, which usually occurs between three to six hours from the beginning of the treatment. The air temperature is then reduced from 160° to 165° F. and the humidity is lowered, corresponding to the reduction in air temperature, being maintained, however, at the saturation point for the new temperature. The temperature of from 160° to 165° is then maintained for an additional ten to thirteen hours, making the total smoking and cooking time approximately sixteen hours. At the end of the sixteen hours the approximate inside temperature of the ham is from 156° to 164° F.

A boneless ham may be treated to the same process after pressing. Boneless hams are preferably treated to the process of the present invention by being placed in the smokehouse while contained in the usual type of cooking container designed for cooking boneless hams in water. After the boneless hams in such containers have been in the heated smoke house for a few hours the natural juices of the meat begin to cook out and come up above the cover. These juices are necessarily subjected to the action of the smoke smudge and absorb the smoke flavor which is carried down into the meat during the smoking and cooking process. It is desirable to chill in the container with the ham submerged in its own natural juice, when much of the cooked out natural juice is reabsorbed by the meat. Thus, it will be seen that the present invention involves simultaneous cooking and smoking and offers an extremely satisfactory method of producing a smoked boneless cooked ham.

It is desirable to filter the smoke with any suitable filtering material to remove dirt and other undesirable elements.

After the hams have been thus simultaneously smoked and cooked, they may be removed from the smokehouse and after being chilled for approximately two hours, rubbed with sugar and browned to the desired degree with a hot flame. Hams so treated are then chilled in a temperature from 34° to 38° F. for about twenty-four hours before shipping.

The present invention presents many advantages in the cooking of hams since it contemplates simultaneously smoking and cooking and permits cooking for longer periods of time, that is, from fifteen to eighteen hours with temperatures from 165° to 195° F. with less resulting shrink in the case of bone-in hams than would result from cooking in water from three and one-half to four hours at a temperature of from 155° to 160°.

The new combination of high temperature, humid air and smoke results in increased tenderness and improvement in flavor.

It should be noted that during the first three or four hours of the treatment very high temperatures are used. During this time, due to the high temperature and high humidity, gelatine is released from the skin and surfaces of the ham and forms a coating thereover which acts as a seal preventing the escape of moisture and natural flavors, thus bringing about the result of low shrink and improved flavor.

The remaining cooking period at the lower temperatures thoroughly cooks the meat encased in its natural gelatine coating, bringing about a more thorough cook than that which has previously been thought possible. The total time of cooking varies, of course, with the size of the ham varying from approximately fourteen hours for a ten pound ham to approximately twenty-two hours for a twenty pound ham. In all cases the cook is carried on until the entirely new flavor, characteristic of the product of the present application, is brought about. This condition, for want of a better term, I call "thorough cook". However, it must be distinguished from mere long subjecting of the ham to the action of heat, since by ordinary methods, hams so long subjected to heat would be overcooked. If cooked in air, it would be dried, if in water, it would be disintegrated, at least in part.

It will be seen that the cooking period comprises two stages, the first stage being a cook at a relatively higher temperature and the second stage being a cook at a relatively lower temperature for a period of time about three times as long as the first stage.

Among the many products which may be advantageously treated in accordance with this invention are bone-in hams, boneless hams, spiced hams, lunch meat, liver cheese, bologna, minced hand, pork tongue, beef tongue, beef brisket, picnics and the like.

In all cases the process would be the same as has been described for hams in the foregoing specification. The cooking time of the various products would vary from eight to eighteen hours, depending upon the size of the container in which the products is cooked. In every case the cooking time would be from two to three times longer and at temperatures from 10° to 35° higher than any cooking schedule that has been used on these products in the past.

I have found that any of these products when processed at these high temperatures in the presence of smoke and saturated air for the long period of time in which I keep them in the combined cooking and smoking process, develop a very unusual and desirable flavor entirely different from any flavor which has been previously produced by other methods of cooking these products.

As used in the claims the term "thoroughly cooked" indicates a condition secured by subjecting the meat to the method of cooking described in the foregoing specification and involves a time element relatively longer than usual for cooking the products in question; that is, at least twice as long as would be considered proper in ordinary cookery.

I claim:

1. The method of treating hams which comprises subjecting the ham simultaneously to the action of heat and smoke in a saturated atmosphere, the temperature being maintained at 190° to 195° Fahrenheit until the inside temperature of the ham reaches approximately 125° Fahrenheit, the temperature being then reduced to from 160° to 165° Fahrenheit and maintained at this temperature until the ham is thoroughly cooked.

2. The method of producing a thoroughly cooked ham which comprises subjecting the cured ham to the combined simultaneous action of heat and smoke in a humid atmosphere for a relatively long period of time, the heat being first carried at a high enough temperature to develop a natural gelatin coating on the outer surface of the ham within a few hours and thereafter reducing the temperature to a point at which the ham continues to cook for a period of time sufficient to thoroughly cook the ham, about three times as long a time as is required to bring up the gelatin coating as aforesaid.

3. The method of treating meat which comprises subjecting the meat to the combined simultaneous action of heat and smoke in a humid atmosphere for a relatively long period of time, the heat being first carried at a high enough temperature to develop a natural gelatin coating on the outer surface of the meat within a few hours and thereafter reducing to a point at which the meat continues to cook for a period of time sufficient to thoroughly cook the meat, about three times as long a time as is required to bring up the gelatin coating as aforesaid.

4. The method of treating meat which comprises subjecting the meat simultaneously to the action of heat and smoke in a saturated atmosphere, the temperature being maintained at 190° to 195° Fahrenheit until the inside temperature of the meat reaches approximately 125° Fahrenheit, the temperature being then reduced to from 160° to 165° Fahrenheit and maintained at this temperature until the meat is thoroughly cooked.

5. The method of producing a thoroughly cooked ham which comprises subjecting the cured ham to the combined simultaneous action of heat and smoke in a humid atmosphere for a relatively long period of time, the heat being first carried to a temperature between 190° and 195° Fahrenheit until the inside temperature of the ham reaches approximately 125° Fahrenheit to develop a natural gelatin coating on the outer surface of the ham and thereafter the temperature being reduced to between 160° to 165° Fahrenheit and maintained at this temperature for a period of time sufficient to thoroughly cook the ham, about three times as long a time as is required to bring up the gelatin coating as aforesaid.

6. The method of treating meat which comprises subjecting the meat to the combined simultaneous action of heat and smoke in a humid atmosphere for a relatively long period of time, the heat being first carried to a temperature between 190° and 195° Fahrenheit until the inside temperature of the meat reaches approximately 125° Fahrenheit to develop a natural gelatin coating on the outer surface of the meat and thereafter the temperature being reduced to between 160° and 165° Fahrenheit and maintained at this temperature for a period of time sufficient to thoroughly cook the meat, about three times as long a time as is required to bring up the gelatin coating as aforesaid.

HARRY H. McKEE.